United States Patent [19]

Kato et al.

[11] Patent Number: 5,383,078
[45] Date of Patent: Jan. 17, 1995

[54] MAGNETIC DISK ASSEMBLY HAVING A HUB WITH A CIRCULAR RECESS EXTENDING CIRCUMFERENTIALLY ALONG AN OUTER PERIPHERAL EDGE THEREOF

[75] Inventors: Yoshitake Kato, Mitsukaido; Kazuya Fukunaga, Ibaraki; Yoshihisa Hitomi, Mitsukaido, all of Japan

[73] Assignee: Hitachi Maxell, Ltd., Osaka, Japan

[21] Appl. No.: 234,604

[22] Filed: Apr. 28, 1994

Related U.S. Application Data

[63] Continuation of Ser. No. 865,185, Apr. 8, 1992, abandoned.

[30] Foreign Application Priority Data

Apr. 10, 1991 [JP] Japan .................................. 3-103536

[51] Int. Cl.⁶ ...................... G11B 23/033; G11B 5/82
[52] U.S. Cl. ...................... 360/133; 360/135
[58] Field of Search ................ 360/133, 135; 369/290, 369/291

[56] References Cited

U.S. PATENT DOCUMENTS

| | | | |
|---|---|---|---|
| 4,656,550 | 4/1987 | Iizuka et al. | 360/133 |
| 4,686,666 | 8/1987 | Dieffenbach | 369/290 |
| 4,694,370 | 9/1987 | Ommori et al. | 360/133 |
| 4,739,434 | 4/1988 | Iizuka et al. | 360/133 |
| 4,757,412 | 7/1988 | Iizuka et al. | 360/133 |
| 4,788,615 | 11/1988 | Oishi | 360/133 |
| 4,868,699 | 9/1989 | Kingsbury et al. | 360/133 |
| 4,920,441 | 4/1990 | Kimura et al. | 360/133 |
| 4,958,249 | 9/1990 | Kadokura et al. | 360/133 |
| 5,090,010 | 2/1992 | Takahashi | 360/133 |

Primary Examiner—Stuart S. Levy
Assistant Examiner—Craig A. Renner
Attorney, Agent, or Firm—Birch, Stewart, Kolasch & Birch

[57] ABSTRACT

A magnetic disk comprises a flexible disk-shaped magnetic sheet with a magnetic layer formed on a substrate film and having an aperture in the center of the disk; a center hub made of metal sheet and having a flange on its outer peripheral part, fabricated by inserting the center hub into the aperture of the magnetic disk-sheet, whereby the flange and an inner peripheral part of the magnetic sheet are bonded together, and wherein a circular recess with a cross-sectional shape, such as step or tapered-shape is provided in the outer peripheral part of the center-hub flange.

6 Claims, 4 Drawing Sheets

MAGNETIC DISK ASSEMBLY HAVING A HUB WITH A CIRCULAR RECESS EXTENDING CIRCUMFERENTIALLY ALONG AN OUTER PERIPHERAL EDGE THEREOF

This application is a continuation, of application Ser. No. 07/865,185 filed on Apr. 8, 1992, now abandoned.

BACKGROUND OF THE INVENTION

1. Field of the Invention

The present invention relates to a magnetic disk for use in a device such as magnetic disk cartridge, and more particularly to a magnetic disk having a disk-shaped magnetic sheet and a center hub.

2. Description of the Related Art

The magnetic disk cartridge mainly comprises a cartridge case or jacket constituted by upper and lower cases or jackets and having a head access aperture, the magnetic disk being accommodated rotatably in the cartridge case, and a shutter for opening/closing the head access aperture in the cartridge case.

The magnetic disk is constituted by a flexible disk-shaped magnetic sheet having an aperture in its central portion, and a center hub having a central protrusion with a flange at its outer periphery. The central protrusion of the center hub is inserted into the central aperture of the magnetic sheet, while the flange of the center hub is bounded or adhered to an inner peripheral portion of the magnetic sheet.

As is illustrated in FIG. 8, a center hub 6 is punched in the direction X from the flange 9 of the center hub 6 to from a projection part 8, which produces a burr 7 on the edge of the flange 9 in the same direction of the projection part 8.

FIG. 8 also shows that a surface 9a of the projection part 8 of the flange 9 becomes the adhered area with the magnetic sheet 5, shown by the imaginary line. In this case, if the burr 7 protrudes to the side of the flange surface 9a, the bonding of the flange 9 with the magnetic sheet is incomplete and, as a result, the magnetic sheet 5 and the center hub 6 may become detached during the usage of the magnetic disk.

As the protruding lengths of burr 7 are not uniform in their directions, if the magnetic sheet 5 and the center hub 6 are bonded together with the burr 7 protruded to the flange surface side 9a, corrugation may occur especially on the surface of inner peripheral area of the flexible magnetic sheet 5.

To overcome this shortcoming, as indicated by the arrow X in FIG. 9, it has been suggested to punch the center hub 6 from the side of the projecting part 8 through the flange 9 whereby the burr 7 is formed on the opposite side of the projection part 8. However, if the center hub 6 with the burr 7 protruding from the flange 9, as illustrated in FIG. 9 is used, the burr 7 will face the inner surface of the upper jacket 1 (FIG. 10). As is generally known in the field of the magnetic disk 4, a spindle 10 is inserted into a spindle hole 11 of the center hub 6 and, with the cooperation of a drive pin 12, the horizontal location of the magnetic disk is defined or established. The insertion of the drive pin 12, which rotates simultaneously with the spindle 10, into the drive pin hole 13, enables the magnetic disk 4 to rotate.

When a magnetic-disk cartridge is placed in a recording and reproducing unit, the drive pin hole 13 of the center hub is not necessarily located at a position of the drive pin 12 of the recording and reproducing unit but, as illustrated in FIG. 10, usually is in the position of its rotating locus. In this position, the end of the drive pin 12 revolves into sliding contact with the bottom surface of the center hub 6 while being biased by a compression spring (not illustrated), and when the drive pin 12 is rotated to a position facing to the drive pin hole 13, the drive pin 12 is inserted into the drive pin hole 13 by a spring-back force of the spring, whereby the magnetic disk 4 starts to rotate. However, until the drive pin 12 is located in the drive pin hole 13, the center hub 6 keeps slanting with one section of the hub 6 being pushed up by the spring loaded on the drive pin 12. If the center hub 6 slants, as described above, the inner side of the upper jacket 1, made of a synthetic resin, is scratched by the burr 7, thus producing shavings, scratched-out pieces or powder therefrom. The shavings may also be produced by a vibration which causes the tip of the burr 7 to scratch the inner part of the upper jacket 1 when the magnetic disk cartridge is being carried around, so that the shavings stick to the magnetic sheet 5, which produces an adverse effect to the recording and reproducing of signals.

SUMMARY OF THE INVENTION

Accordingly, an object of the present invention is to settle the shortcoming of the related art, providing a magnetic disk with high reliability.

To fulfill this object, the present invention is directed at providing a magnetic disk comprising a flexible magnetic disk-sheet with a magnetic layer formed on a substrate film and having an aperture in the center of the disk, a center hub, made of metal sheet or plate and having a flange on its outer peripheral part inserted into the aperture of the magnetic disk-sheet, whereby the flange and inner peripheral part of the magnetic sheet are bonded together, and wherein the center hub has a circular recess with a cross-sectional, having a concave or chamfered or tapered shape, in the outer peripheral part of the flange thereof.

The circular recess provided at the outer peripheral area of the center-hub flange serves to solve the problem or adverse effect caused by the burr without regard for the punching direction of the center hub. Namely, the burr does not contact the inner side of the jacket or case directly, because the burr positions itself within the depth of the recess even if it protrudes toward the opposite side of the projection part of the center hub. Therefore, the burr does not scratch the inner side of case to produce the shavings or scratched-out powder which may cause read/write error. On the other hand, even if the burr protrudes toward the same side of the projection part of the center hub, the burr does not contact directly with the magnetic sheet, because the burr is positioned within the depth of the circular recess. Accordingly, this invention provides a constant adhesive-force between the magnetic sheet and the center hub, and prevents the magnetic sheet from being peeled partially or detached completely from the center hub during the actual usage of the magnetic disk.

In addition, as the burr does not directly contact the magnetic sheet, a flatness in the inner peripheral area of the magnetic sheet can be maintained without being corrugated. Therefore, a constant contacting-pressure can be maintained between a magnetic head and the magnetic sheet at inner peripheral tracks on the inner peripheral area of the magnetic disk sheet, thereby enabling appropriate recording and reproducing of signals.

DETAILED DESCRIPTION OF THE INVENTION

Figure 1:
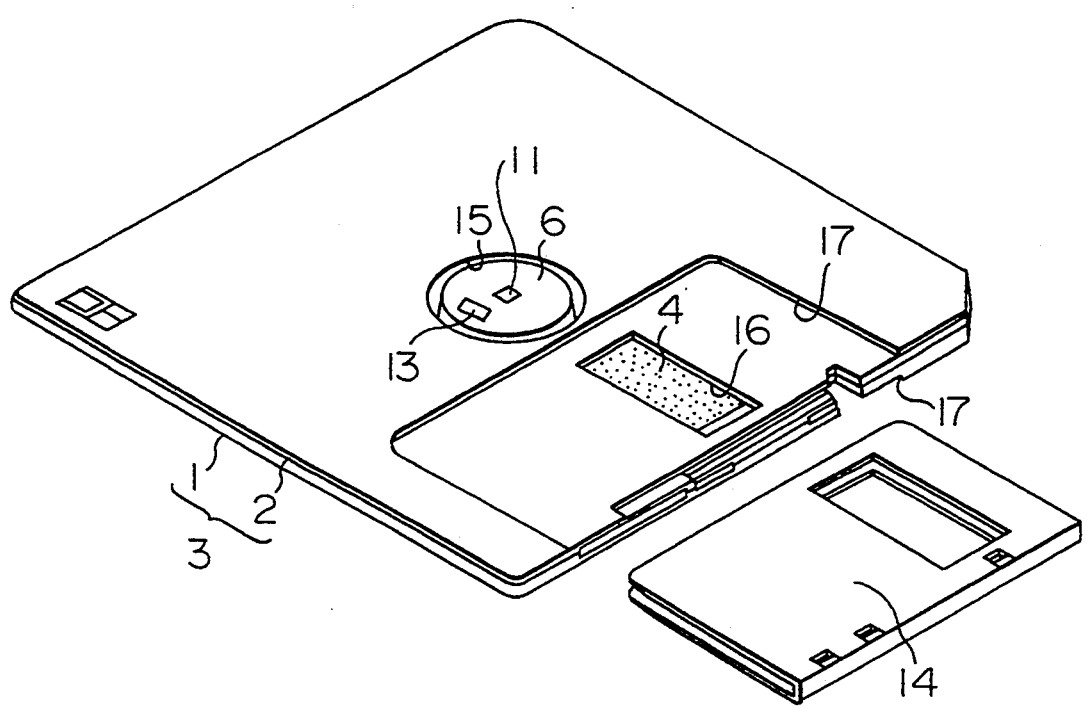
FIG. 1 is a perspective view of a partially exploded magnetic-disk cartridge according to the present invention.

As illustrated in FIG. 1, the magnetic disk cartridge mainly comprises the cartridge jacket or case 3, a magnetic disk 4 disposed rotatably in the case 3, and a slidable shutter 14 supported by the cartridge jacket 3.

The cartridge jacket 3 is constituted by an upper jacket or case 1 and a lower jacket or case 2 molded of hard synthetic-resin such as ABS resin. In about the center of the lower jacket 2, there is an aperture 15 for receiving a rotating drive shaft and, close to the aperture 15, a rectangular head-access aperture 16. Likewise, the other head-access aperture (not shown) is formed in the upper jacket 1. As illustrated in FIG. 1, there are recesses 17 in a front or anterior area of the upper jacket 1 and the lower jacket 2 to regulate a slidable length of the shutter 14. The head-access apertures 16 are respectively situated at the center of these recesses 17.

Figure 2:
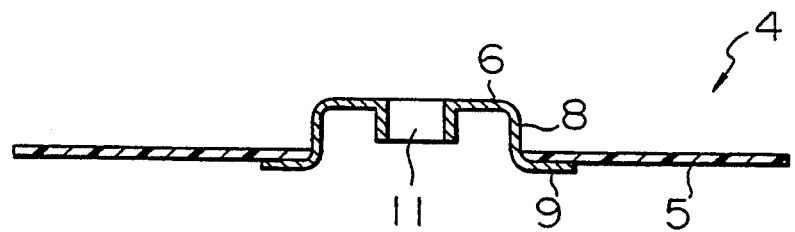
FIG. 2 is a sectional view illustrating a magnetic disk used for the magnetic-disk cartridge of FIG. 1.
Figure 3:
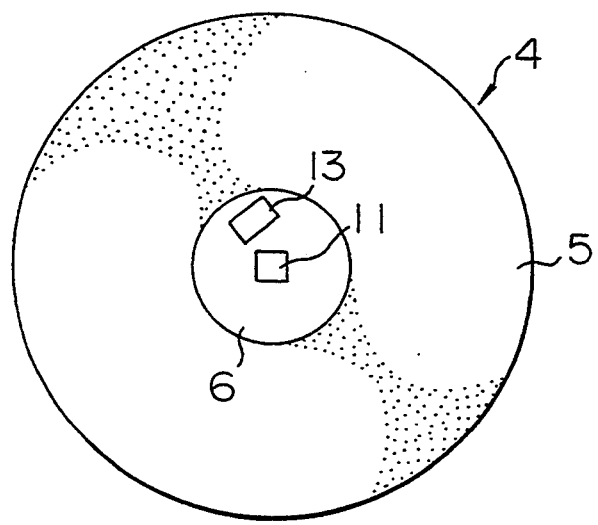
FIG. 3 is a plan view illustrating the magnetic disk of FIG. 2 used for the magnetic-disk cartridge of FIG. 1.

As illustrated in FIG. 2 and FIG. 3, the magnetic disk 4 includes a flexible disk-shaped magnetic sheet 5 having a central hole, and a center hub 6 with a flange 9 about its outer-peripheral area. A protruded part 8 of the center hub 6 is inserted into the central hole of the magnetic sheet 5, where the flange 9 of the center hub 6 and inner peripheral area of the magnetic sheet 5 is bonded with an adhesive such as an acrylic resin adhesive.

Figure 4:
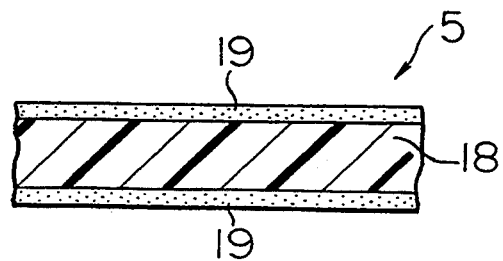
FIG. 4 is an enlarged sectional view illustrating a magnetic sheet used for the magnetic disk of FIG. 2.

As shown in FIG. 4, the magnetic sheet 5 has a substrate film 18 made of non-magnetic material and magnetic layer/layers deposited on one or both sides of the substrate film 18. The substrate film 18 is made of such synthetic resin films as polyethylene terephthalate (PET), polyethylene naphthalate (PEN), or polyimide.

The magnetic layer 19 is made of a mixture such as ferromagnetic powder, binder, lubricant, and reinforcing powder. The following materials may be used as the ferromagnetic powder: α-Fe, barium ferrite, Co—Ni, Co—P, γ—$Fe_2O_3$, $Fe_3O_4$, Co-containing γ—$Fe_2O_3$, Co-containing $Fe_3O_4$, $CrO_2$, Co, or Fe—Ni, and the like.

The following materials are used as the binder: copolymer of vinyl chloride and vinyl acetate, copolymer of vinyl chloride, vinyl acetate, and vinyl alcohol, urethane resin, polyisocyanate compound, radiation-hardened resin, or fibric or cellulose resins such as nitrocellulose, and the like.

The following materials are used as the lubricant: dialkylpolysiloxane having 1 to 4 carbon atoms in a alkyl function thereof, diorganopolysiloxane such as diphenylpolysiloxane and methylphenylpolysiloxane, more than one or two kinds of fatty acid ester selected from a group of oleyloleate, glycerintrioleate, butylcellosolve stearate, and isoamylstearate, liquid paraffin, fluorocarbon resin, or squalane, and the like. A ratio of the lubricant to the ferromagnetic powder is usually between 0.1 and 25 weight percent, preferably between 1 and 10 weight percent.

The following materials are used as reinforcing powder: metal oxide such as $Al_2O_3$ or $Cr_2O_3$, silicon carbide, or silicon nitride, and the like. A ratio of the reinforcing powder to the ferromagnetic powder is usually between 0.1 and 25 weight percent.

The following materials are used as an organic solvent: methylisobutylketone, methylethylketone, cyclohexane, benzene, toluene, xylene, ethylacetate, tetrahydrofuran, or dioxane, and the like.

Upon necessity, a dispersant, filler, or anti-electrostatic-changing additives, and the like, can be appropriately added to the magnetic coating materials.

PREFERRED EMBODIMENTS

The following is a concrete example of the magnetic coating materials.

Example of Composition of Magnetic Coating

| Materials Barium Ferrite (Hc: 5300 Oe, Saturation magnetization: 57 emu/g, Average particle diameter: 0.04 μm) | 100 weight parts |
| --- | --- |
| Copolymer of vinyl chloride, vinyl acetate, and vinyl alcohol | 11.0 weight parts |
| Urethane resin | 6.6 weight parts |
| Trifunctional-isocyanate compound | 4.4 weight parts |
| Alumina ($Al_2O_3$) powder (average particle diameter: 0.78 μm) | 15 weight parts |
| Carbon black | 2 weight parts |
| Oleil olate | 7 weight parts |
| Cyclohexane | 150 weight parts |
| Toluene | 150 weight parts |

The magnetic coating materials of this composition were mixed and dispersed in a ball mill until uniform adjustment was attained and deposited on both sides of the substrate film of a 75 μm-thick polyethylene terephthalate (PET) so that the dry-thickness should be 2.5 μm and then dried. After a calendering process, a magnetic layer 19 with less than 0.01 μm of a surface roughness Ra (0.08 mm cut-off) was prepared. Finally, after a 16-hour heat treatment at 80° C., punched in a disk, the magnetic sheet 5 was completed by surface polishing.

Figure 5:
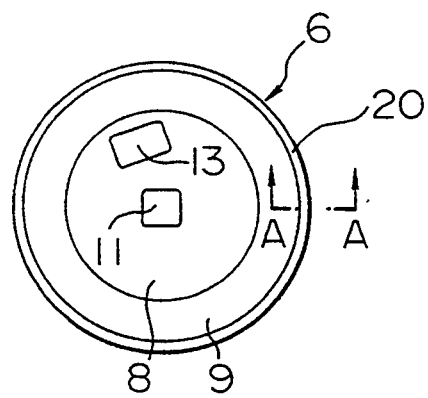
FIG. 5 is a plan view illustrating a center hub used for the magnetic disk of FIG. 2.
Figure 6A:
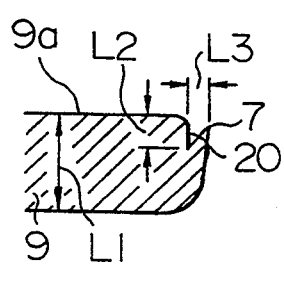
FIG. 6A is an enlarged sectional view along a line A—A of the FIG. 5.
Figure 6B:
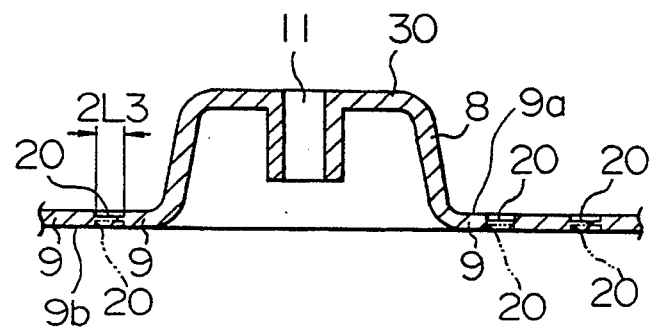
FIG. 6B is a sectional view illustrating the strip or band sheet-metal before the center hub is punched.

A center hub 6 has the protruded part 8 in the center and the flange 9 in its outer-peripheral area. In the center of the protruded part 8, there is a spindle hole 11, and deviated therefrom, there is a drive pin hole 13. As shown in FIGS. 5, 6A and 6B, in the outer-peripheral area of the flange 9, a circular recess 20, whose cross-section is stepped, concave or tapered-shape, is pre-pressed before the center hub 6 is punched continuously from a strip or band metal-sheet 30.

While the center hubs 6 are punched out continuously from the strip metal-sheet 30, a ring-like burr 7 is produced in a direction along the punching. However, as the above described circular recess 20 is recessed at the outer peripheral area, the burr 7 will never protrude from the surface 9a of the flange 9 and can be situated within the depth of the recess 20.

A typical relationship of dimensions in the FIG. 6A is as follows:

thickness L1 of the flange 9 is 200 to 400 μm; depth L2 of the recess 20 is 10 to 30 μm; and width L3 of the stepped circular recess 20 is 0.3 to 1 mm. This width of the recess 20 before being punched, as illustrated in FIG. 6B, may be, for example, twice as wide as L3 which is the width after being punched.

Figure 7A:
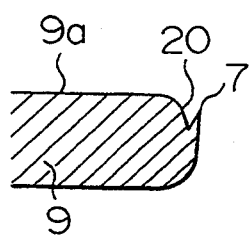
FIG. 7A is an enlarged sectional view, similar to FIG. 6A, illustrating a modification of the center hub.
Figure 7B:
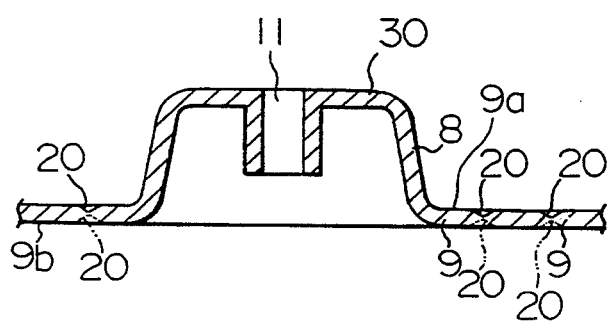
FIG. 7B is a sectional view illustrating the strip sheet-metal before the modified center hub is punched.
Figure 8:
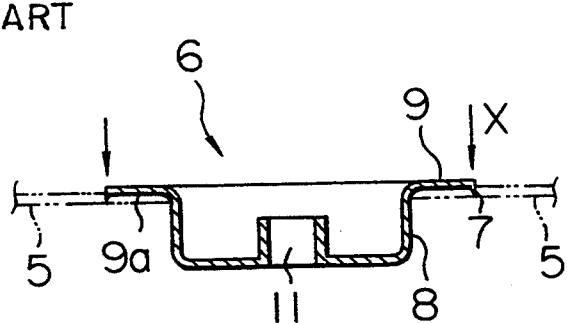
FIG. 8 is a sectional view illustrating a conventional center hub.
Figure 9:
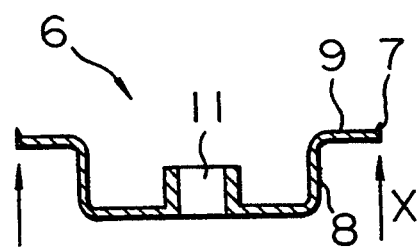
FIG. 9 is a sectional view illustrating an alternate form of a conventional center.
Figure 10:
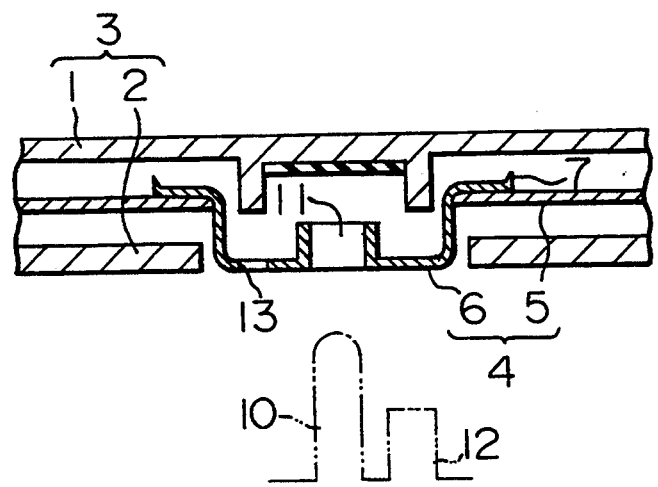
FIG. 10 is a sectional view illustrating a part of a magnetic disk cartridge to assist describing the shortcoming of the burr produced on the center hub of FIG. 9.

FIG. 7A illustrates a modified example of the circular-recess having a cross-section of a chamfer type (tapered shape), where the burr 7 will never protrude from the surface 9a of the flange 9 and can be situated within the depth of the recess 20 with the cross-section of a chamfer type (tapered shape). FIG. 7B shows the strip or band of metal-sheet, before the center hubs are punched, where the recess 20 has generally a V-shaped cross-section.

FIGS. 5, 6A, 6B, 7A and 7B illustrate a case where the burr 7 is produced from the flange 9 toward the protruded part 8. However, this invention is not restricted by such direction, but can also be applied to a case where the burr is produced from the protruded part 8 toward the flange 9. In this alternative case, the recess 20 with the cross-section of a step or chamfer type (tapered shape) should be made on the side 9b where the burr 7 protrudes, as shown by imaginary lines 20 in FIGS. 6B and 7B.

As described above, the invention successfully avoids the adverse effect caused by the burr by providing the recess in the outer-peripheral area of the flange of the center hub, which serves to have the burr within the depth of the recess regardless of the punching direction.

Thus, if the burr protrudes to the opposite side of the protruded part of the center hub, the burr will be free from direct contact with the inner surface of the jacket. This can prevent the error caused by shavings generated from scratching the inner surface of the jacket.

On the other hand, if the burr protrudes to the same side of the protruded part of the center hub, the burr will not contact directly with the magnetic sheet. This ensures a constant adhesive force between the magnetic sheet and the center hub and the magnetic sheet will not peel partially or be detached completely.

Furthermore, as the burr does not contact directly with the magnetic sheet, the inner-peripheral area of the magnetic sheet will not be corrugated; therefore, constant pressure can be maintained between the inner tracks of the magnetic sheet and the magnetic head. This ensures that the magnetic disk will record and reproduce signals appropriately.

The above described invention can successfully provide a magnetic disk with high reliability.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic disk comprising a flexible disk-shaped magnetic sheet having a substrate film coated with a magnetic layer formed on at least one side thereof, having therein a central hole, and a center hub made of a punched metal sheet having generally a cylindrical main body portion fitted in said central hole of said magnetic sheet, and an annular flange extending radially outward from one end of said cylindrical main body portion having an upper face and a lower face, said upper face of said flange of said center hub being adhered directly to an inner peripheral portion of a side of said magnetic sheet faced to said upper face of said flange, said center hub having a circular recessed portion in and extending circumferentially along a radially outer peripheral edge of said upper face of said flange, a radially outermost edge of said circular recessed portion being inclusive of a burr of said metal sheet which does not extend beyond said upper face of said flange.

2. A magnetic disk as defined in claim 1, wherein said recessed portion has a step-shape in cross-section.

3. A magnetic disk as defined in claim 2, wherein a thickness of said flange is from 200 to 400 μm, and a depth of said circular recessed portion is from 10 to 30 μm.

4. A magnetic disk as defined in claim 3, wherein a width of said circular recessed portion is from 0.3 to 1 mm.

5. A magnetic disk as defined in claim 1, wherein said circular recessed portion has a chamfer or tapered shape in cross-section.

6. A magnetic disk cartridge comprising a cartridge case made of a synthetic resin, and a magnetic disk rotatably accommodated in said case, said magnetic disk comprising a flexible disk-shaped magnetic sheet having a substrate film coated with a magnetic layer formed on at least one side thereof, having therein a central hole and a center hub of a punched metal sheen having generally a cylindrical main body portion fitted in said central hole and an annular flange extending radially outward from one end of said cylindrical main body portion having an upper face and a lower face, said upper face of said flange of said center hub being adhered directly to an inner peripheral portion of a side of said magnetic sheet faced to said upper face of said flange, said center hub having a circular recessed portion in and extending circumferentially along a radially outer peripheral edge of said upper face of said flange, a radically outermost edge of said circular recessed portion being inclusive of a burr of said metal sheet which does not extend beyond said upper face of said flange.

* * * * *